May 20, 1969 — C. J. STOZEK — 3,444,804
COFFEE BREWER DISTRIBUTOR
Filed July 26, 1967
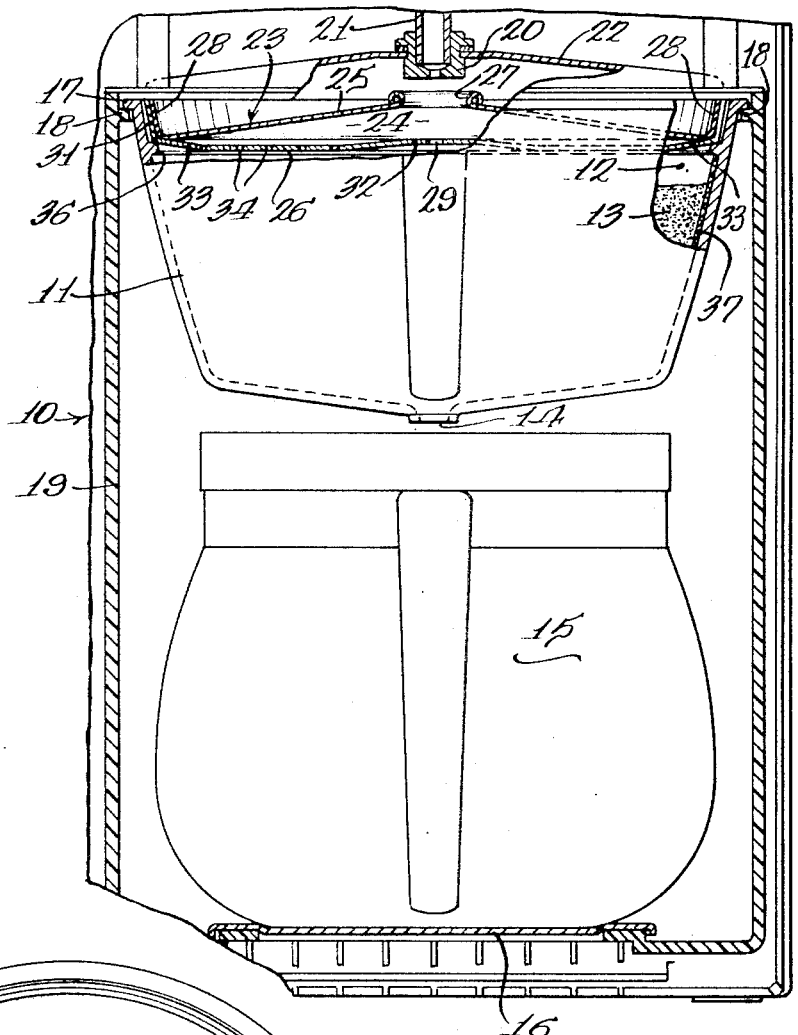
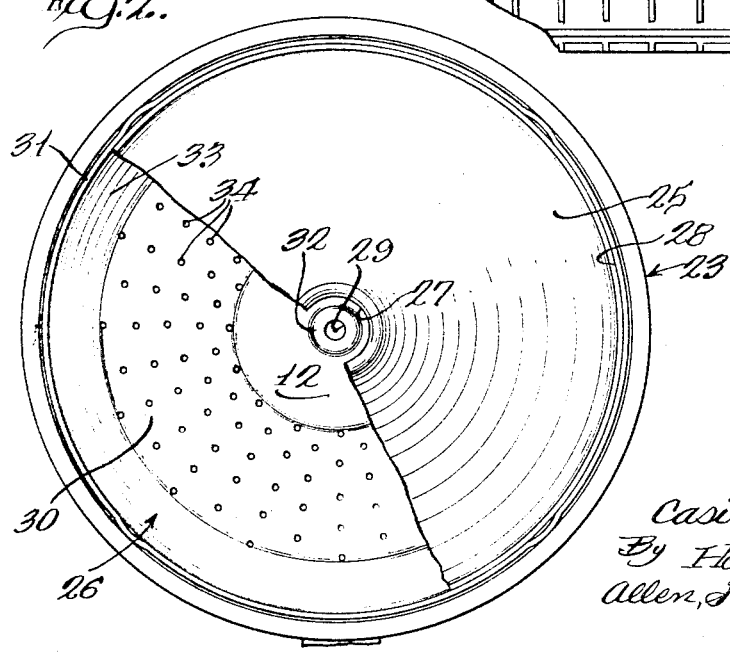
Inventor
Casimir J. Stozek
By Hofgren, Wegner,
Allen, Stellman & McCord
Attys

United States Patent Office 3,444,804
Patented May 20, 1969

3,444,804
COFFEE BREWER DISTRIBUTOR
Casimir J. Stozek, Roselle, Ill., assignor to Cory Corporation, a corporation of Delaware
Filed July 26, 1967, Ser. No. 656,131
Int. Cl. A47j *31/30*
U.S. Cl. 99—302      15 Claims

ABSTRACT OF THE DISCLOSURE

A structure for effecting a substantially uniform transverse distribution of hot water to a coffee brewing cartridge from a hot water supply delivering the water in the form of a stream. The distribution means includes a pressure chamber structure which effects an improved positive flow of the hot water in a uniform distribution into the brewing chamber. The brewed coffee is delivered from the brewing chamber downwardly to a subjacent decanter for serving.

---

This invention relates to coffee brewers and in particular to means for providing hot water to the brewing chamber of a coffee brewer.

In one conventional form of coffee brewer, a brewing cartridge is provided for holding a charge of coffee grounds from which the coffee infusion is made by the delivery to the brewing chamber of a suitable quantity of hot water. The brewed coffee is delivered from the brewing chamber through a bottom opening to a suitable pouring means, such as a conventional decanter. In such coffee brewers, the hot water is provided from a suitable heating tank through a delivery conduit into the upper portion of the brewing chamber. It is desirable to spread the delivered water transversely across the brewing chamber to effect a uniform brewing of the coffee by flow of the hot water in contact with substantially all of the coffee charge in the brewing chamber. One device provided for effecting such a distribution of the delivered hot water comprises a spray head attached to the delivery end of the conduit superjacent the brewing chamber which, by virtue of the pressure of the hot water in the delivery conduit, causes the hot water to be delivered into the brewing chamber in the form of a plurality of small angularly outwardly directed streams. Another structure provided for such distribution of the hot water comprises a spreader plate comprising a foraminous wall which is disposed over the brewing chamber to receive the water from the delivery conduit and permit the water to flow downwardly therethrough through the numerous openings onto the subjacent coffee charge. While the foraminous spreader plate structure provides an improved spread-out delivery of the water to the brewing chamber, it has a number of serious disadvantages limiting the usefulness thereof. One disadvantage of the known spreader plate devices is the difficulty of providing a sufficient rate of flow through the spreader plate to prevent backup of the delivered hot water on the upper surface of the plate so as to permit the backed up water to overflow the edges thereof. An enlargement of the individual openings in the spreader plate does not satisfactorily solve the problem, as such enlargement of the individual streams causes an undesirable boring of holes in the coffee charge bed and effectively precludes a uniform distribution of the hot water throughout the entire charge, thus resulting in an incomplete extraction of the coffee infusion. Providing more holes in the spreader plate does not satisfactorily solve the problem as the water tends to flow through the center holes and the edge holes do not properly pass a proportionate quantity of water therethrough for effectively uniform brewing of the coffee. Reducing the size of the holes and providing a greater number thereof, similarly does not satisfactorily solve the problem as the surface tension of the water, or oil on the plate, prevents satisfactory flow of the water through the relatively small diameter holes, and thus an uneven distribution of the flow similarly results.

The present invention comprehends an improved flow distribution structure for use in a coffee brewer eliminating the disadvantages of the above-discussed conventional brewers in a novel and simple manner.

Thus, a principal feature of the present invention is the provision of a new and improved coffee brewer structure.

Another feature of the invention is the provision of such a coffee brewer structure having a new and improved means for effecting a substantially uniform transverse distribution of delivered hot water into the brewing chamber thereof.

A further feature of the invention is the provision of such a coffee brewer structure having a cup-shaped cartridge defining a brewing chamber and means for delivering a stream of hot water downwardly into the cartridge for brewing coffee therein, means for effecting a substantially uniform transverse distribution of the delivered hot water into the brewing chamber including means defining a pressure chamber having an upper wall provided with an inlet opening and a lower foraminous wall, and means for supporting the pressure chamber means in overlying relationship to the cartridge to receive the stream of hot water through the inlet opening, the foraminous wall having a preselected flow capability to pass the hot water therethrough at a rate less than the rate of delivery of the stream when the pressure chamber is substantially empty and to pass the hot water therethrough substantially at the rate of delivery of the stream when the pressure chamber is at least partially filled with hot water as a result of the increased pressure of the hot water on the bottom wall.

Still another feature of the invention is the provision of such a coffee brewer structure wherein the distribution means comprises separable upper and bottom walls.

A further feature of the invention is the provision of such a coffee brewer structure wherein the distribution means is separable from the cartridge.

A still further feature of the invention is the provision of such a coffee brewer structure wherein the distribution means is removably carried by the cartridge.

Still another feature of the invention is the provision of such a coffee brewer structure wherein the upper wall is frusto-conical and tapers downwardly to the bottom wall.

A yet further feature of the invention is the provision of such a coffee brewer structure wherein the bottom wall is arranged in a new and improved manner to provide improved uniform distribution of the hot water to the brewing chamber.

A further feature of the invention is the provision of such a coffee brewer structure wherein the upper wall is provided with an upstanding peripheral flange.

Other features and advantages of the invention will be apparent from the following description taken in connection with the accompanying drawing wherein:

FIGURE 1 is a fragmentary front elevation, with portions broken away, of a coffee brewer structure having a water distribution means embodying the invention; and FIGURE 2 is a top plan view of the water distribution structure with a portion broken away for facilitated illustration of the invention.

In the exemplary embodiment of the invention, as disclosed in the drawing, a coffee brewer apparatus generally designated 10 is shown to comprise a brewing cartridge 11 defining a brewing chamber 12 in which a quantity of coffee grounds 13 are disposed for flow of hot water therethrough to effect a brewing of coffee for delivery through a bottom outlet 14 of the cartridge into a subjacent receptacle such as decanter 15. As shown in FIGURE 1, the decanter 15 may be carried on a suitable electrical heater 16 for maintaining the brewed coffee hot as desired. The cartridge 11 may be provided with an outturned upper flange 17 slidably resting on an in-turned slide flange 18 of a housing structure 19 for removably supporting the cartridge subjacent a metering orifice 20 provided at the end of a hot water delivery conduit 21. The metering orifice 20 may be carried on a plate 22 carried in turn on the housing 19 to be centered superjacent the center of the brewing cartridge 11 when the brewing cartridge is installed in the housing 19 on the supports 18.

The hot water is delivered through the conduit 21 and metering orifice 20 at a preselected rate controlled by the water pressure and the metering orifice and flows downwardly therefrom in the form of a stream toward the center of the cartridge.

The means provided herein for effecting a substantially uniform transverse distribution of the delivered stream of hot water comprises a device generally designated 23 defining a pressure chamber 24. The device 23 includes an upper frusto-conical wall member 25 and a lower wall member 26 cooperatively defining the chamber 24. As best seen in FIGURE 1, the upper wall member 25 is provided with a center opening 27 at the center of the distribution device 23. The upper wall 25 includes an upstanding peripheral flange 28 and is imperforate between opening 27 and flange 28.

The bottom wall 26 in provided with a small center opening 29, a foraminous portion 30, and an outer upstanding flange 31. The bottom wall is substantially flat, but is provided with a slightly upwardly raised mid-portion 32 in which is provided the central opening 29. An annular outer portion 33 extends slightly frusto-conically upwardly to the flange 31, as best seen in FIGURE 1. The foramina 34 of portion 30 are distributed about the axis of the bottom wall 26 to provide a substantially uniform transverse distribution of hot water delivered onto the bottom wall through the opening 27 from the metering orifice 20. As best seen in FIGURE 1, the upper wall 25 is nested within the lower wall 26, with the flange 28 of the upper wall annularly fitted within the flange 31 of the bottom wall.

Cartridge 11 is provided with an in-turned rib 36 spaced below the out-turned flange 17 at a distance substantially equal to the height of the flange 31, and the peripheral edge of the bottom wall 26 rests thereon in the assembled arrangement of FIGURE 1 whereby the distribution device 23 is carried in the upper portion of the cartridge 11 with opening 27 coaxially subjacent the metering orifice 20 when the cartridge is installed in the housing 19 on the slide supports 18, as shown in FIGURE 1. Thus, the entire distribution device 23 may be readily installed and removed from the cartridge 11, and the upper wall 25 may be readily removed and installed relative to the lower wall 26 for facilitated maintenance of the brewer apparatus 10.

A filter paper 37 may be placed in the cartridge 11 and a suitable quantity of ground coffee 13 placed therein. The distribution device 23 may then be installed in the cartridge 11 by firstly assembling the upper wall 25 within the lower wall 26 and installing the assembly in the upper portion of the cartridge to rest on rib 36. The thusly assembled cartridge may then be slid into water receiving position on the supports 18, and a preselected quantity of hot water delivered through the conduit 21 and metering orifice 20 into the pressure chamber 24 through the subjacent opening 27. The total area of the openings in the bottom wall 26 may be comparable to the area of the opening 27, and is preselected to permit a sufficient flow therethrough to preclude overflow of the delivered hot water from the distribution device. More specifically, the flow capacity of the openings in bottom wall 26 is preselected to be slightly less than the rate of delivery of the hot water from the metering orifice 20 when the hot water is first delivered to the pressure chamber 24. Thus, a quantity of hot water backs up on the upper surface of the bottom wall 26 during this initial delivery of the hot water notwithstanding some flow of the hot water through the openings in the bottom wall. The backup of the water in pressure chamber 24 continues until increased pressure of the quantity of water in chamber 24 causes an increase in the rate of flow of the hot water through the openings in the bottom wall 26 and thus maintains the rate of flow downwardly through the bottom wall 26 at least equal to the rate of flow of the hot water delivered from the metering orifice 20, thereby to maintain the level of water below the top of opening 27 during the continued delivery of the hot water during the brewing operation. In the illustrated embodiment, the quantity of water in the pressure chamber may substantially fill the pressure chamber to a point only slightly below the top of opening 27.

Upon termination of the delivery of hot water from the metering orifice 20, the level of water in the pressure chamber 24 drops until substantially all of the water passes downwardly through the openings in the bottom wall 26 from the pressure chamber to complete the delivery of the hot water distributedly over the ground coffee 13 in the brewing chamber 12.

By virtue of the increased pressure obtained in the delivery of the hot water through the bottom wall 26, surface tension characteristics of the water are overcome, and the water is caused to flow through substantially all of the foramina 34 as well as the relatively large opening 29 at the center of the bottom wall. It has been found that in extreme cases where films of oil and the like many obstruct certain of the foramina, the increased pressure of the hot water in the pressure chamber 24 effectively removes the obstruction and permits the desired flow through substantially all of the foramina to assure the desired uniform distribution of the hot water over the bed of coffee grounds 13. The foramina may be relatively small as the pressure of the hot water in chamber 24 effectively overcomes the surface tension therof, and thus a further improvement in the distribution of the hot water is provided by permitting an increased number of foramina in the foraminous member 30 permitted by the decrease in the size of the individual foramina.

Illustratively, the rate of delivery of the hot water through metering orifice 20 may be preselected to provide a brewing time of approximately 120 to 180 seconds. Thus, during the major portion of the brewing operation, the high water level in the pressure chamber 24 is maintained, whereby the improved pressurized flow of the hot water through the openings in the bottom wall 26 is maintained during the major portion of the brewing operation.

The distribution device 23 may be formed of a suitable economical material such as stainless steel for facilitated maintenance and long life. In one illustrative embodiment of the invention, the distribution device has an outside diameter of approximately seven inches, the central opening 29 in the bottom wall 26 has a diameter of approximately .2 inch, the foraminous portion 30 is provided with 135 foramina, 34 having a diameter of approximately .046 inch, and the width of the foraminous portion 30 is approximately 1½ inches having an inside diameter of approximately 2⁷⁄₁₆ inches and an outside diameter of approximately 5⁷⁄₁₆ inches. The upper surface of the bottom wall is preferably a bright surface, and the height of the flange 31 may be approximately one-half inch.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a coffee brewer having a cup-shaped cartridge defining a brewing chamber and means for delivering a stream of hot water downwardly into the cartridge for brewing coffee therein, means for effecting a substantially uniform transverse distribution of the delivered hot water into the brewing chamber comprising: means defining a pressure chamber having an upper wall provided with an inlet opening and a lower foraminous wall; and means for supporting the pressure chamber means in overlying relationship to the cartridge to receive the stream of hot water through said inlet opening, said inlet opening having a cross-sectional area substantially larger than the cross-sectional area of said stream whereby said chamber is open to atmosphere through said inlet during said stream delivery, said foraminous wall having a preselected flow capability to pass the hot water therethrough at a rate less than the rate of delivery of said stream when said pressure chamber is substantially empty and to pass the hot water therethrough substantially at the rate of delivery of said stream when said pressure chamber is at least partially filled with hot water as a result of the increased pressure of the hot water on the bottom wall.

2. The coffee brewer means of claim 1 wherein said upper wall is separably carried by said bottom wall.

3. In a coffee brewer having a cup-shaped cartridge defining a brewing chamber and means for delivering a stream of hot water downwardly into the cartridge for brewing coffee therein, means for effecting a substantially uniform transverse distribution of the delivered hot water into the brewing chamber comprising: means defining a pressure chamber having an upper wall provided with an inlet opening and a lower foraminous wall; and means for supporting the pressure chamber means in overlying relationship to the cartridge to receive the stream of hot water through said inlet opening, said foraminous wall having a preselected flow capability to pass the hot water therethrough at a rate less than the rate of delivery of said stream when said pressure chamber is substantially empty and to pass the hot water therethrough substantially at the rate of delivery of said stream when said pressure chamber is at least partially filled with hot water as a result of the increased pressure of the hot water on the bottom wall, said pressure chamber means further including an upstanding peripheral wall.

4. The coffee brewer means of claim 1 wherein said inlet opening has an area approximately that of the total opening area of the foraminous bottom wall.

5. In a coffee brewer having a cup-shaped cartridge defining a brewing chamber and means for delivering a stream of hot water downwardly into the cartridge for brewing coffee therein, means for effecting a substantially uniform transverse distribution of the delivered hot water into the brewing chamber comprising: means defining a pressure chamber having an upper wall provided with an inlet opening and a lower foraminous wall; and means for supporting the pressure chamber means in overlying relationship to the cartridge to receive the stream of hot water through said inlet opening, said foraminous wall having a preselected flow capability to pass the hot water therethrough at a rate less than the rate of delivery of said stream when said pressure chamber is substantially empty and to pass the hot water therethrough substantially at the rate of delivery of said stream when said pressure chamber is at least partially filled with hot water as a result of the increased pressure of the hot water on the bottom wall, said bottom wall being provided with an enlarged opening in alignment with said inlet opening of said upper wall.

6. The coffee brewer means of claim 1 wherein said upper wall is frusto-conical narrowing upwardly.

7. In a coffee brewer having a cup-shaped cartridge defining a brewing chamber and means for delivering a stream of hot water downwardly into the cartridge for brewing coffee therein, means for effecting a substantially uniform transverse distribution of the delivered hot water into the brewing chamber comprising: means defining a pressure chamber having an upper wall provided with an inlet opening and a lower foraminous wall; and means for supporting the pressure chamber means in overlying relationship to the cartridge to receive the stream of hot water through said inlet opening, said foraminous wall having a preselected flow capability to pass the hot water therethrough at a rate less than the rate of delivery of said stream when said pressure chamber is substantially empty and to pass the hot water therethrough substantially at the rate of delivery of said stream when said pressure chamber is at least partially filled with hot water as a result of the increased pressure of the hot water on the bottom wall, said bottom wall being generally flat and having an upwardly displaced mid-portion.

8. In a coffee brewer having a cup-shaped cartridge defining a brewing chamber and means for delivering a stream of hot water downwardly into the cartridge for brewing coffee therein, means for effecting a substantially uniform transverse distribution of the delivered hot water into the brewing chamber comprising: means defining a pressure chamber having an upper wall provided with an inlet opening and a lower foraminous wall; and means for supporting the pressure chamber means in overlying relationship to the cartridge to receive the stream of hot water through said inlet opening, said foraminous wall having a preselected flow capability to pass the hot water therethrough at a rate less than the rate of delivery of said stream when said pressure chamber is substantially empty and to pass the hot water therethrough substantially at the rate of delivery of said stream when said pressure chamber is at least partially filled with hot water as a result of the increased pressure of the hot water on the bottom wall, said bottom wall being provided with an upstanding peripheral flange, said upper wall being received within said flange.

9. The coffee brewer means of claim 1 wherein said inlet opening is at the center of said upper wall.

10. The coffee brewer means of claim 1 wherein said upper wall is frusto-conical narrowing upwardly and having an outer edge portion engaging said bottom wall.

11. The coffee brewer means of claim 1 wherein said supporting means comprises means for supporting the pressure chamber means on said cartridge.

12. The coffee brewer means of claim 1 wherein said supporting means comprises means for supporting the pressure chamber means in said cartridge.

13. The coffee brewer means of claim 1 wherein said supporting means comprises in-turned means on said cartridge for underlying the periphery of said pressure chamber means.

14. The coffee brewer means of claim 1 wherein said supporting means comprises means for separably supporting the pressure chamber relative to said cartridge.

15. The coffee brewer means of claim 1 wherein said preselected flow capability of said foraminous wall is preselected to pass the hot water therethrough substantially at the rate of delivery of said stream only when said pressure chamber is substantially filled with hot water.

References Cited

UNITED STATES PATENTS 2,997,940   8/1961   Pecoraro   99—302
3,030,874   4/1962   Fiori   99—302 X
3,232,212   2/1966   Karlen   99—302 X ROBERT W. JENKINS, *Primary Examiner.*

U.S. Cl. X.R.

99—295